(12) United States Patent
Hesse

(10) Patent No.: US 11,461,235 B2
(45) Date of Patent: Oct. 4, 2022

(54) METHOD AND APPARATUS TO PROTECT CODE PROCESSED BY AN EMBEDDED MICRO-PROCESSOR AGAINST ALTERING

(71) Applicant: SHENZHEN GOODIX TECHNOLOGY CO., LTD., Shenzhen (CN)

(72) Inventor: Kay Hesse, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 238 days.

(21) Appl. No.: 16/904,449

(22) Filed: Jun. 17, 2020

(65) Prior Publication Data

US 2020/0320007 A1 Oct. 8, 2020

Related U.S. Application Data

(63) Continuation of application No. PCT/EP2018/083616, filed on Dec. 5, 2018.

(30) Foreign Application Priority Data

Jan. 4, 2018 (EP) .................................... 18150269

(51) Int. Cl.
| | |
|---|---|
| *G06F 21/71* | (2013.01) |
| *G06F 21/64* | (2013.01) |
| *G06F 12/0864* | (2016.01) |
| *G06F 7/58* | (2006.01) |
| *G06F 21/60* | (2013.01) |

(Continued)

(52) U.S. Cl.
CPC .......... *G06F 12/0864* (2013.01); *G06F 7/588* (2013.01); *G06F 21/602* (2013.01); *G06F 21/64* (2013.01); *G06F 21/72* (2013.01)

(58) Field of Classification Search
None
See application file for complete search history.

(56) References Cited

U.S. PATENT DOCUMENTS 10,007,615 B1 *  6/2018 Gazit ................. G06F 12/0888
10,831,663 B2 * 11/2020 Kahle ................. G06F 12/0828
(Continued)

FOREIGN PATENT DOCUMENTS

| | | |
|---|---|---|
| GB | 2459662 A | 4/2009 |
| WO | WO2010019916 A1 | 2/2010 |

OTHER PUBLICATIONS

Analysis of Password and Salt Combination Scheme To Improve Hash Algorithm Security. Sutriman. IJACS. (Year: 2019).*
(Continued)

*Primary Examiner* — Venkat Perungavoor
(74) *Attorney, Agent, or Firm* — J.C. Patents

(57) ABSTRACT

A method to protect code against altering includes reading immutable boot code from a ROM. A code image is loaded from an external memory and a hash is calculated by a core unit. The hash is initially authenticated using the boot code for decrypting the hash of the external memory. A salted hash for each equivalent of a cache line of the code image is concurrently calculated by a cache protection block and the salted hash for each cache line in an internal hash table is stored. If the authentication succeeds, a part of the code image is loaded into a secure cache of the embedded micro-processor.

20 Claims, 3 Drawing Sheets

(51) Int. Cl.
 *G06F 21/72* (2013.01)
 *G06F 21/78* (2013.01)

(56) References Cited

U.S. PATENT DOCUMENTS

| | | | |
|---|---|---|---|
| RE49,011 E * | 4/2022 | Colgrove | G06F 3/0608 |
| 2007/0028051 A1* | 2/2007 | Williamson | G06F 12/0864 |
| | | | 711/216 |
| 2016/0125187 A1* | 5/2016 | Oxford | H04L 63/123 |
| | | | 713/2 |
| 2016/0283750 A1* | 9/2016 | Durham | H04L 9/3242 |
| 2021/0390024 A1* | 12/2021 | Durham | H04L 9/3242 |

OTHER PUBLICATIONS

Salty Secret: Let US Secretly Salt the Secret. Chowdhury. IEEE. (Year: 2017).*
Design of a provably secure biometrics-based multi-cloud-server authentication scheme. Kumari. Elsevier. (Year: 2017).*
Securing the virtual machine images in Cloud computing. Kazim. ACM. (Year: 2013).*
International Search Report for PCT/EP2018/083616.
European search report for EP18150269.1.
IVEC: Off-Chip Memory Integrity Protection for Both Security and Reliability; Ruirui Huang and G. Edward Suh Cornell University Ithaca, NY 14853, USA {huang,suh}@csl.cornell.edu.

* cited by examiner

METHOD AND APPARATUS TO PROTECT CODE PROCESSED BY AN EMBEDDED MICRO-PROCESSOR AGAINST ALTERING

CROSS-REFERENCE TO RELATED APPLICATIONS

This application is a continuation of International Application No. PCT/EP2018/083616, filed on Dec. 5, 2018, which claims priority to European Patent Application No. 18150269.1, filed on Jan. 4, 2018. The disclosures of the aforementioned applications are hereby incorporated by reference in their entireties.

TECHNICAL FIELD

The disclosure discloses a method to protect code processed by an embedded micro-processor against altering and an apparatus for protecting code against altering using the inventive method.

BACKGROUND

Embedded micro-processors are used in an extremely wide spectrum of applications. Some of these applications, especially those where the device with the embedded processor is connected to other devices (e.g. a smartphone), require that their program code is protected against unauthorized change. For quite a number of scenarios there are proven methods available to achieve that.

Another aspect of embedded processors is that they often are part of cost-sensitive platforms (e.g. low-cost commodities) and/or power-sensitive applications (e.g. portable devices). Both of these limitations push towards a minimization of embedded RAM for these processors. Embedded RAM consumes silicon real estate, adds to production cost and power consumption. Usual ways to avoid or minimize embedded RAM are
 replace embedded RAM with embedded ROM, or
 replace embedded memory with external, or
 use a smaller embedded RAM as cache, loaded from external memory.

All three approaches listed above have their disadvantages: ROMs don't allow program updates, external memory might be too slow for efficient execution and potentially pose a security risk and caches are even more prone for "man-in-the-middle" (MITM) attacks.

SUMMARY

The objective of the disclosure will be solved by a method to protect code processed by an embedded micro-processor against altering comprising the following steps:
 reading immutable boot code from an internal read only memory (ROM);
 loading a code image from an external memory and calculating a hash by a core unit;
 initially authenticating the hash using the boot code for decrypting the hash of the external memory; whereas
 concurrently calculating a salted hash for each equivalent of a cache line of the code image by a cache protection block;
 storing the salted hash for each cache line in an internal hash table; whereas
 if the authentication succeeds, a part of the code image is loaded into a secure cache of the embedded micro-processor; otherwise if a secure cache miss occurs, the code image is reloaded from the external memory and the salted hash for the missed cache line is re-calculated by the cache protecting block and is checked against the stored salted hash in the internal hash table.

The general idea of the disclosure is to use a combination of a true random number generator (TRNG) and an internal RAM that stores a salted hash for each cache line. A part of the code image in the sense of this disclosure is an equivalent of a cache line. The internal RAM in the sense of this disclosure is also a secure cache. The hashes are then checked each time a cache line is reloaded from external memory. Using FIG. 2 as reference, the principal algorithm works like this:

(1) An immutable boot code is read from an internal ROM (safe). In addition to the standard approach this code uses the true random number generator (TRNG) to determine a random number. This number is stored in an internal (safe) location of the embedded micro-processor. An internal safe location in the sense of this disclosure is a register or location in an embedded RAM and not part of the cache. The point is that the random number needs to be stored for later use.

(2) The core unit loads a code image from an external memory, which may be corrupted by a man in the middle and calculates the hash. A man in the middle in the sense of this disclosure is someone who wants to change the original code image for any unwanted purpose. The hash is finally authenticated using the manufacturer's public key from the ROM to decrypt the reference hash stored in the external memory. For both tasks, hash calculation and signature decryption, an optional cryptography unit may be used. If the authentication fails at this step, appropriate measures can be taken, i.e. stop execution completely, use fall-back code from the ROM, indicate to some higher-level agent, etc. (2b) Concurrently while executing this initial authentication of the external memory the cache protection block snoops the data transfer and through the connected hash table calculates a salted hash for each equivalent of a cache line of the code image and stores the result in an internal hash table, which has one entry per cache line.

(3) If the authentication succeeded, a part of the code image may be loaded into the secure cache. The secure cache in the sense of this disclosure is the RAM with the already authenticated and checked cache lines of the code image. Every time the authentication is successful, this part is stored into the secure cache. The advantage is that an already checked and authenticated part of external loaded code can be used without checking it again, because in this state the code could not be changed by a man in the middle attack.

Therefore, it is possible to take and use the code from the secure cache for future code execution (step 4).

On a cache miss, code is reloaded from the external memory. A cache miss in the sense of this disclosure is when the core addresses a memory location that is not currently present in the cache and must therefore be fetched from the external (and hence potentially unsafe) memory. A secure cache in the sense of this disclosure means that the code present in the cache is guaranteed to be identical to the code originally authenticated during step (1).

(5) If the code image is reloaded from the external memory, the cache protecting block will snoop again the transfer from the external memory and use the stored random number, which is obtained from the TRNG in step (1) and stored in a register or embedded RAM, and re-calculate the hash for this cache line. SO, the random number generated by the TRNG is used for re-calculating the hash for the cache line, which has to be reloaded from the external memory due to the cache miss. It then checks it against the stored value in the hash table. A mismatch would indicate alteration of the external memory contents.

The advantage of the present disclosure is that if a program code has broken for one SoC, e.g. by a man-in-the-middle attack, the code is not broken for all SoC with the same program code.

In an embodiment of the disclosure the method further comprises determining a random number by a true random number generator (TRNG) and storing the random number in an internal location of the embedded micro-processor. So, the true random number generator (TRNG) is used to generate a random number s which is used for the calculation of an entropy transfer function $e(c_i,s)$ and hence for the calculation of a hash for each cache line. As a result, the calculated hashes are unique for every SoC, also for SoC with the same program code. The ROM boot code would determine the random number and store it internally for later use by the cache protect block. The random number has no direct connection to the boot code. It is needed for later use with the secure cache. The use of a TRNG has the advantage that the TRNG provides a random number which is essentially a "secret" an attacker cannot know and therefore allows generating hashes that an attacker (even with knowledge of the hashing algorithm) cannot replicate.

In a further embodiment, the method further comprises taking the authenticated cache lines of the code image from the secure cache at future code execution. The advantage is that an already checked and authenticated part of external loaded code can be used without checking it again, because when the code is already stored in the secure cache the code could not be changed by a man in the middle. The cache as such is not secure; it is made secure with the help of the hash table and hash-checking for each cache-line (re-)load.

In another further embodiment of the method calculating and decrypting the hash is performed by a cryptography unit. The hash of the external memory can be decrypted optionally, whereas this is done by a cryptography unit which is part of the embedded micro-processor. It is optional for the purpose of this disclosure if the code image transferred from the external memory to the internal memory is or is not be encrypted. The disclosure intends to protect code against altering, not against knowledge theft. The disclosure is, however, compatible with encrypted (not just signed) code.

If the authentication fails, the execution will stop completely or a fall-back code from the ROM will be used or the failure will be reported to some higher-level agent. Because of this it can be prevented that an altered code image, e.g. through a man in the middle attack, is loaded into the embedded micro-processor. Due to the inventive method an alteration of the original code image can be detected before any damage can occur.

In an embodiment the method further comprises calculating the salted hash H for a cache line with a cache line length l by taking an entropy-transfer function $e(c_i,s)$ and a hashing function h, wherein $c_i$ is a word from a currently processed cache line CL, s is the random number used as salt or seed and $e_1$ is a result of the entropy-transfer function $e(c_i,s)$.

The hashing function h as well as the entropy-transfer function $e(c_i,s)$ need to comply with certain constraints, which will be described in the following.

The function to calculate the salted hash H of a cache line takes the general form of a sum-like iteration over the results of an entropy-transfer function e of the random number and the cache line word. This can be expressed by $$H=\Sigma_i e(c_i,s)=h(\{e_i | \forall i \in CL\}) \quad \text{(eq. 1)}$$

whereas $c_i$ is a word from the currently processed cache line CL, s is the random number used as salt and $e_i$ is the result of the function $e(c_i,s)$.

So, in one embodiment of the method the salted hash H is calculated by $H=\Sigma_i e(c_i,s)=h(\{e_i | \forall i \in CL\})$.

In order to allow for on-the-fly calculation while the cache line is loaded critical-word-first, the hashing function h needs to fulfill the following constraint:

$$h(e_i)|_{i=0}^{l-1}=h(e_j)|_{j=(i+k) \bmod l}^{(k+l-1) \bmod l} \forall i,j,k\; 0 \leq i,j,k \leq l \quad (2)$$

with l being the cache line length and the modulo operation reflects the fact of the address wrapping if the cache line reload started in the middle of the line.

So, in one embodiment of the method the hashing function h fulfills the constraint that $h(e_i)|_{i=0}^{l-1}=h(e_j)|_{j=(i+k) \bmod l}^{(k+l-1) \bmod l} \forall i,j,k\; 0 \leq i,j,k \leq lt$, whereas l is being a cache line length.

Eq. 2 essentially states that the hash is independent of the starting element as long as it is iterated over the full line. Only as an example, for l=4, eq. 2 turns into $$e_0 \circ e_1 \circ e_2 \circ e_3 = e_1 \circ e_2 \circ e_3 \circ e_0 = e_2 \circ e_3 \circ e_0 \circ e_1 = e_3 \circ e_0 \circ e_1 \circ e_2 \quad \text{(eq. 3)}$$

with ∘ denoting the hash operation. In case ∘ is commutative like an algebraic sum or a XOR sum, the condition stated by eq. 2 is trivially fulfilled. Further, the hashing function h should be chosen in a way that already small changes in cache line contents (a single bit) will lead to a change in the hash.

The entropy-transfer function $e(c_i,s)$ also has to fulfill some requirements: Firstly, it should be relatively easy to calculate, i.e. require only a little hardware. Secondly, it should be bijective, i.e. $\forall i,j: i \neq j \rightarrow e(c_i,s) \neq e(c_j,s)$ and $\forall s,s': s \neq s' \rightarrow e(c_i,s) \neq e(c_i,s')$. This ensures that the function will not decrease overall entropy when applied to the cache line words. Thirdly, it should work with random numbers of arbitrary bit width. For a hash result of bit width m there is a $1:(2^m-1)$ chance for a hash collision, i.e. an altered cache line content with the same hash result. Since a potential attacker can know the hashing and entropy-transfer functions the random number must at least have as many bits as the hash result. On the other hand, it does not need to have more bits as this would not minimize the chance to achieve a hash collision just by guessing. An attacker would have to change some contents bits to equalize the actual code alteration and still yield the same hash.

So, there are several possible choices, both for the entropy transfer as well as for the hashing functions:

In an embodiment of the inventive method the entropy-transfer function $e(c_i,s)$ is an algebraic sum modulo hash widths of $c_i$ and s, and/or a XORing of $c_i$ and s, and/or a scrambling of $c_i$ controlled by s, and/or a generation of a CRC checksum on $c_i$ with s as seed.

If the entropy-transfer function $e(c_i,s)$ is an algebraic sum modulo hash widths of $c_i$ and s, one can just use a simple adder to merge information from $c_i$ and (parts of) s.

If the entropy-transfer function $e(c_i,s)$ is a XORing of $c_i$ and s, one forms the XOR-sum of $c_i$ and s. It is possible to use only a sub set of the bits from s for a given $c_i$ and thus distribute s over all cache line words. In an extreme case there would be only one bit from s per $c_i$, determining whether or not to invert $c_i$.

If the entropy-transfer function $e(c_i,s)$ is a scrambling of $c_i$ controlled by s, bits from $c_i$ are swapped in position which are controlled by (bits of) s. Various sub types are possible: For example, bit reversion: bits are "mirrored" with respect to the middle position depending on one bit from s, or bit rotation: some bits of s determine the direction and number of positions $c_i$ is rotated, or bit group swapping: some bits of s determine how bit groups from $c_i$ swap places, e.g. depending on one bit from s, $c_i[7:0]$ is mapped to $c_i[3:0,7:4]$, assuming $c_i$ is 8 bits wide, or any combination of the above is also possible when using scrambling of $c_i$ controlled by s.

If the entropy-transfer function $e(c_i,s)$ is a generation of a CRC checksum on $c_i$ with s as seed, then the remainder of a polynomial division is calculated, using s as start value (the seed) and established generator polynomials, like the "Ethernet" polynomial $x^{32}+x^{26}+x^{22}+x^{16}+x^{12}+x^{11}+x^{10}+x^{8}+x^{7}+x^{5}+x^{4}+x^{2}+x+1$.

It is also possible to use as entropy-transfer function $e(c_i,s)$ any combination of the above-mentioned functions. Since all of the mentioned functions are linear, any combination of them will work, although there is no point in it, unless each individual contributor uses different bits from s.

Using non-linear commutative operations like multiplication for $e(c_i,s)$ is not a good idea. Although it would work in principle, this function is not bijective (just assume s is zero, then all results are mapped to zero) and therefore the overall entropy is decreased.

In an embodiment of the inventive method the hashing function h is an algebraic sum $H=\Sigma_{i=0}^{l} e_i$ or a full parity over all $e_i$ or a partial parity function.

Although if the hashing function h is an algebraic sum $H=\Sigma_{i=0}^{l} e_i$ this is a possible solution, this is somewhat weak, as a change in one bit of $c_i$ could be equalized with a change in just one bit in $c_j$.

If the hashing function h is a full parity over all $e_1$ this is the parity over each bit-column of But again, this is a possible solution, but also weak for the same reason as mentioned above.

If the hashing function h is a partial parity function it avoids the weakness of the plain XOR sum while keeping the calculation simple.

Using non-linear commutative operations is discouraged, as one factor of zero would turn the whole result to zero, making it possible to "hide" alterations.

In a very preferred embodiment of the method the entropy-transfer function $e(c_i,s)$ is bijective. This is necessary, because it is important to map different values of original memory contents to different values of hashes. Otherwise, if two different memory values would be mapped to the same hash value, an attacker could change the original value to that other value with the same hash value without being detected.

The objective of the disclosure will also be solved by an apparatus for protecting code against altering comprising a cache protecting block comprising an entropy transfer block for controlling a bit scrambling of a loaded code image from an external memory cache line wise and connected to a hash function block that is connected to a hash accumulator register, whereas the hashing function block and the hash accumulator register both calculating a salted hash for a current scrambled cache line, the apparatus further comprising a hash table storing reference hashes of the code image of the external memory and a check block comparing the salted hash with a stored reference hash in the hash table.

The choice of the hashing and the entropy-transfer function has an important influence of the hardware required to implement the functionality. If the hashing function is constructed in a manner that every cache word (after entropy-transfer) has the same way of contributing to the hash value, the hardware effort is minimized because only a fixed structure is needed, instead of lots of multiplexing to treat the cache words differently.

In an embodiment of the apparatus the entropy transfer block is connected to an internal location of an embedded micro-processor.

The cache protecting block snoops the data being reloaded into the cache and forwards them to the entropy-transfer block. The entropy transfer block takes the stored random number from an internal location and uses it to control the bit scrambling.

From the entropy-transfer block the scrambled data is forwarded to the hashing function block. This executes the partial parity calculation, but only for the terms from the current scrambled cache word. It merges these with the contents of the hash accumulator register. The hash accumulator stores intermediate parity results calculated by the hashing function block, and also forwarding the intermediate result back to the hashing function block. The hash table stores the reference hashes to check against. The check block compares the final hash accumulator value, after the complete cache line has been processed, with the stored reference hash in the hash table. It then indicates whether the cache line has been altered. This indicator can then be used in the embedded processor to trigger appropriate action.

In each embodiment a true random number generator is connected to the cache protection block for providing random numbers and for hashes that are not replicable. Because the TRNG provides a random number which is essentially a "secret" an attacker cannot know and therefore allows generating hashes that an attacker (even with knowledge of the hashing algorithm) cannot replicate.

In another embodiment of the apparatus for protecting code against altering the hashing function block and the hash accumulator register comprises several multiplexers and a low number of XOR gates for partial parities.

The stated method and apparatus according to the disclosure have the following positive effects compared to the state of the art: The novel method allows the use of caches even in the presence of a man-in-the-middle attack between the cache and the external memory from which the cache is reloaded.

The disclosure combines some known techniques, like a true random number generator (TRNG). Various implementations of these are known, e.g. thermal noise or the use of cascaded ring oscillators as sources of entropy. TRNG are widely used in security protocols, mostly when they are based on some form of challenge-response handshaking. Bit scrambling of bit vectors is also a known technique. This is used both for security reasons as well as to minimize bit string errors in some communication applications (e.g. in block codes for Compact Discs or DVDs). Parity functions are widely used in communication applications to detect and correct bit errors. And cyclic redundancy checks (CRC) are widely used in communication and storage applications to detect and correct bit errors.

The disclosure combines these known technologies in a novel way to achieve the following: The new method allows the usage of a cache for an embedded processor (either for minimizing embedded RAM or speed-up of execution) in a secure manner. Protecting the cache contents against a man-in-the-middle attack between the cache and the external memory is now very easy. The method works for arbitrary cache organizations and sizes and the method is transparent for the embedded processor. Specifically, it works with the typical critical-word-first cache reloading schemes and it does not add extra latency to the cache reload (the snooping and check run in parallel to the actual reload) and it does not require a change in the contents of the external memory image. Furthermore, it does not require additional words or different addressing and it works independently of the cache contents, it can work with an additional symmetric cache encryption. The method provides a high likelihood of detection of malicious code altering. The likelihood is dependent on the width of the hash and random number and can be adjusted to an application's needs (size vs. security). A further advantage can be seen therein that the method has a low latency for tamper detection. As soon as the last word of a cache line has been loaded the check against the stored hash can be executed. It provides a choice for the hash as well as the entropy-transfer functions and also a secure caching even under the regime of full disclosure of the hash and entropy-transfer functions. The method can be implemented with only little hardware overhead and it only requires little extra internal RAM for the hash table. The size is hash width x number of cache lines and thus is comparable in size with the cache's normal tag-RAM (or even smaller).

The disclosure will be explained in more detail using exemplary embodiments.

BRIEF DESCRIPTION OF THE DRAWINGS

The appended drawings show
FIG. 1 Illustration of a standard authentication approach (state-of-the-art)

Figure 1:
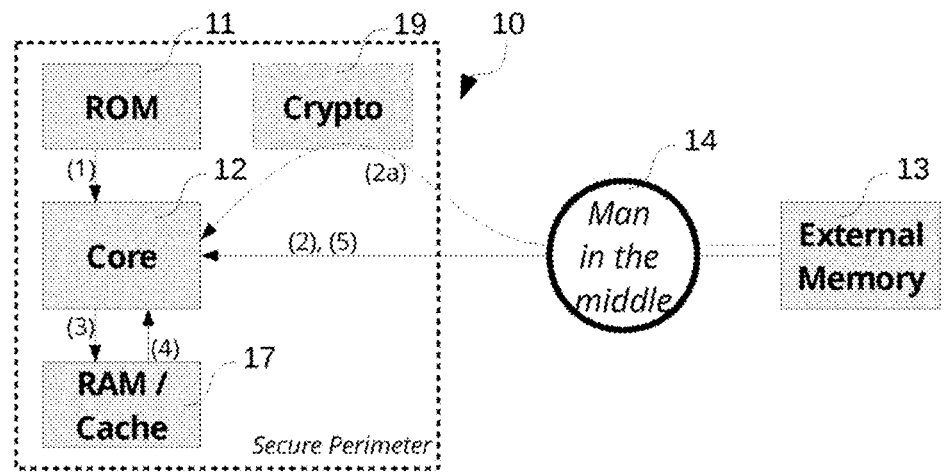
Figure 2:
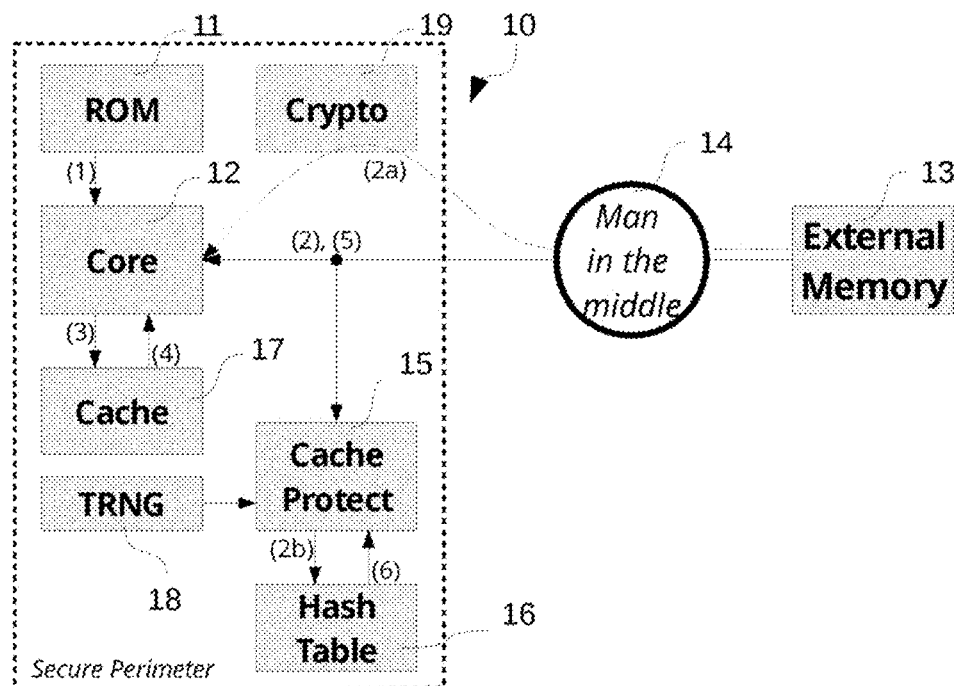
FIG. 2 Illustration of a secure cache approach.

LIST OF REFERENCE SIGNS 10 apparatus to protect code against altering, embedded micro-processor
11 read only memory (ROM)
12 core unit
13 external memory
14 man in the middle
15 cache protection block
16 internal hash table
17 cache, secured by 15
18 true random number generator
19 cryptography unit
20 entropy transfer block
21 hashing function block
22 hash accumulator register
23 check block
24 multiplexer

DETAILED DESCRIPTION OF THE EMBODIMENTS

This disclosure intends to provide a solution for the security problems caused by cache usage on platforms with embedded processors and external memory (typically FLASH memory). It should be noted that there is a slightly different reason to use caches in embedded processors vs. those in desktop CPUs: In desktop processors caches are mainly a means to achieve a high operating frequency of the CPU without being limited by rather slow external memory. In embedded processors caches are used more to minimize cost and/or power.

For the sake of this disclosure, "secure execution" can be defined as the guarantee that 1) the code the embedded processor executes is exactly the code the manufacturer has produced,
2) the code either cannot be changed at all OR,
3) the code can only be changed by authorized agents,
4) an unauthorized change can be detected and reacted upon (e.g. by stopping execution).

Item 2) can easily be fulfilled when the code is stored in a ROM. The standard approach to cover items 3) and 4) is to sign the code by the authorized entity and have the embedded processor check this signature. The signature is typically a hash (e.g. SHA) over the memory image which is then encrypted with the manufacturer's private key and decrypted with the public key in the processor, using established public-key (asymmetric) cryptography methods (e.g. RSA).

Public-cryptography is also widely used to establish a "chain of trust", which allows receiving code from a source the embedded processor has not fully under control (e.g. an external FLASH): The root of trust is immutable code in embedded ROM, this code then can execute the hashing and authentication of the FLASH code when loading it into its embedded RAM. This is secure because a man-in-the-middle attack (e.g. a maliciously replaced FLASH) can be detected during authentication and after the code is loaded it is safely stored in the embedded RAM. Once the code has been checked and loaded into the embedded RAM any tampering with the external memory has no effect anymore (and doesn't even need to be detected until the next time the image is loaded).

FIG. 1 illustrates this standard approach to establish a chain of trust. The following steps are executed:

(1) Immutable boot code is read from an internal ROM (safe).

(2) The core loads the code image from an external memory, whereas this code image may be corrupted by a man in the middle attack, and calculates a hash. A hash is an individual signature for some input data in order to verify the authenticity of these data. The hash is finally authenticated using the manufacturer's public key from the ROM to decrypt the reference hash stored in the external memory. For both tasks, hash calculation and signature decryption an optional cryptography unit may be used, see path (2a) in FIG. 1. If the authentication fails at this step, appropriate measures can be taken, e.g. stop execution completely, use fall-back code from the ROM, indicate to some higher-level agent, etc.

(3) If the authentication succeeded, the code image is loaded into the internal RAM. Actually, this copy will most likely happen in parallel to step (2).

(4) For any future code execution the authenticated image is taken from the internal RAM (safe).

When working with caches there is not enough space to hold the whole code image from the external memory inside the embedded RAM. After all, saving silicon area is one of the points in using a cache in the first place. FIG. 1 can again serve as an illustration. It is possible to execute the initial authentication steps (1) to (3) as described above, with the caveat that step (4) only holds true as long as the cache still holds only code copied there during step (3). The chain of trust is subsequently broken the first time there is a cache miss and a cache line has to be reloaded from the external memory (step indicated with (5)). When at this point a man in the middle has control over the external memory the code can be altered without detection.

Theoretically, it would be possible to secure each single cache line in the external memory with a signed hash that can be checked against. There are the following drawbacks to this approach, though:

It requires at least one additional word to be read (the hash) when retrieving the cache line. This is not compliant with the typical processor's cache reload mechanism, which only issue memory accesses for exactly the cache line, not for additional words. This also requires extra area in the memory image, either interspersed (i.e. one word after each cache line, which completely deranges the cache line addressing) or in a separate memory region, accessed by a separate read.

Furthermore, most hashing algorithms require an exact order of the memory words to be hashed. Processors typically load their cache lines "critical word first". This has the following consequences: Either the hash calculation has to be deferred until the complete line is in internal memory, which means adding latency to the check as it cannot be done on-the-fly; OR the cache reload behavior of the processor must be changed to in-order bursts only. This would add latency to program execution, since the processor now has to wait longer for the missing code to become available.

It is therefore the object of the disclosure to fulfill the following requirements:
Support standard "critical word first" cache line reloading strategies;
Do not require changes in the external memory image;
Be transparent to the embedded processor, i.e. do not change addressing, potential additional contents encryption, or add excessive latency;
Require only minimal hardware for implementation;
Flexibly support arbitrary cache sizes, cache line lengths and protection levels;
Protect the cache despite full disclosure of the used approach and algorithms (i.e. no "security by obscurity"), also for System on Chip (SoC) with the same program code.

In the following an exemplary embodiment of the disclosure will be described. There are multiple options for the entropy-transfer function and the hashing function that can be combined for the hash calculation. The overall strength of the hash against malicious code alteration depends on a careful choice of these options. The goal always has to be to force an attacker to change a maximum of bits just to counter-act his actual intended change. This then allows the entropy from the random number to take maximum effect, making it maximal hard to guess a changed content with the same hash value as the legitimate one. Since it is easier to choose the entropy-transfer function once the hashing function has been selected, and the construction of the hashing function will be explained first.

The hashing function can be a partial parity. The idea of partial parity hashes is to calculate the XOR-sum of a different subset of the cache line bits (actually of the result of the entropy-transfer function on the cache line bits) for each bit of the hash value, while still all bits of a cache line contribute to the hash value. Different construction procedures are possible that have the same overall parameters. One of these will be explained using FIG. 3 as reference. It shows the rather unrealistic example of a 4-bit hash for a cache line size of 5 bytes. Typical real applications would be cache lines of 8 or 16 words of 32 bit each. This, however, also proves that the approach is generic enough to be tailored to various real-life applications. The bytes a to e are separated by longer vertical lines.

Figure 3:
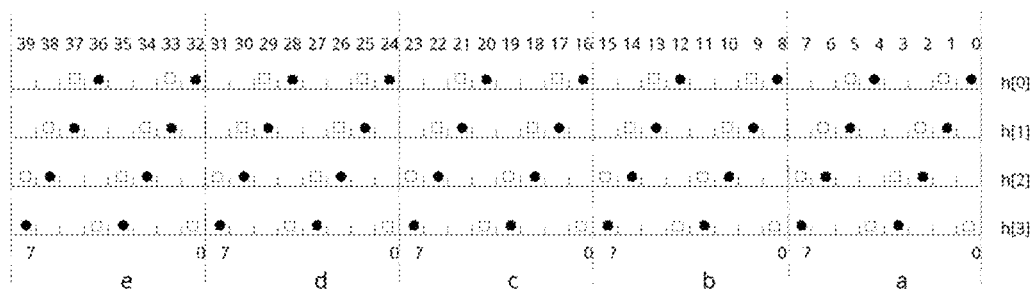
FIG. 3 Construction of a partial parity hashing function.

Each cache line CL consists of w words of b bits each, i.e. a total of B=w*b bits to hash. The hash word as the result of the hashing function h consists of p bits. In the example of FIG. 3 it is w=5, b=8 andp=4. In order to cover all cache line bits in the hash word, each hash bit has to take B/p=w*b/p bits into account. FIG. 3 illustrates the construction principle: All cache line bit positions are considered as bit positions of a long binary control word (the lines h[i]). One such word describes how the partial parity that forms one bit of the hash word is calculated: A "1" in the control word means that the respective cache line bit contributes to the partial parity. The requirements to use all bits of the cache line for the hash and to avoid redundancy among the hash bits can be translated to the requirement that all control words need to be different with each control word having B/p ones. A general and straightforward way to achieve this is diagonalization as it is also used in FIG. 3: the black dots represent the ones in the control word and indicate which cache line bit contributes to which hash word bit. So far, however, this would mean that each cache line bit contributes to only one hash bit. As a consequence this means that the man in the middle only has to change a second bit for each manipulated cache bit to provoke a hash collision and hence prevent detection of the attack.

The counter measure is to have each cache line bit contribute to multiple hash bits. The same principle of diagonalization can be applied to find distribution patterns to add the same cache line bits to other hash bit parities. In FIG. 3 this is illustrated by the small quadrates. The maximum number C of this overlap, i.e. the number of hash bits a cache bit contributes to is half of the width of the hash word (a greater overlap would only introduce redundancy into the partial parities and thus weaken the protection).

The general approach according to FIG. 3 can be expressed as follows:

$$h_i \mid_{i=0}^{p-1} = \bigoplus_{c=0}^{c-1} \bigoplus_{k=0}^{p-1} w\left[\frac{x}{b}\right][x \bmod b] \text{ with} \quad \text{(eq. 4)}$$

$$x = (c + k * p) \bmod (w * b) \quad \text{(eq. 5)}$$

Figure 4:
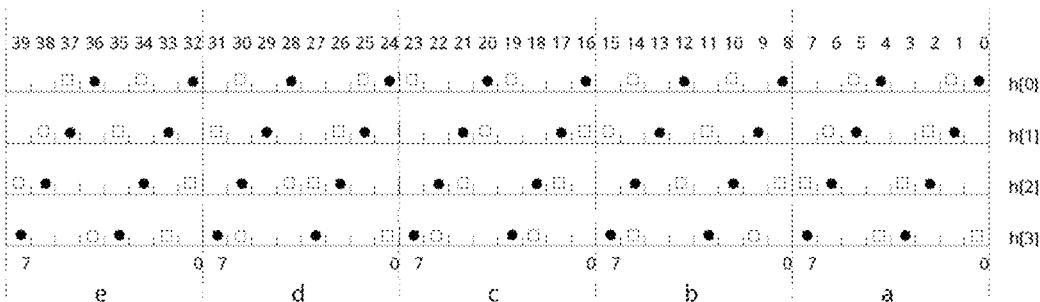
FIG. 4 Alternative construction of a partial parity hashing function.

It should be mentioned that the contribution patterns according to FIG. 3 and eq. 4 are not the only possible options with the features that they cover all cache bits, avoid redundancy and distribute the coverage evenly over all hash value bits. Another pattern with these features is shown in FIG. 4. It uses a pattern that looks more random but still follows a general principle of diagonalization.

Although mathematically equivalent in hash strength, there is one important difference between the hashing functions according to FIG. 3 and FIG. 4: the more regular pattern in FIG. 3 allows for a simpler implementation in hardware, as each cache word contributes with the same bit positions to the hash value bits.

As has been mentioned before it must be assumed that an attacker knows the hash function and the entropy-transfer function, too. With respect to the example in FIG. 3 the attacker would construct a hash collision for an altered bit as follows: Assuming the attacker has altered bit a[0], he then needs to flip bit a[1], so the parity result for h[0] is not changed. The bit flip of a[1] then makes it necessary to also flip a[2], so h[1] stays the same. Subsequently, also bit a[3] needs to be flipped, so h[2] stays the same. One can see that by flipping a[1], a[2] and a[3] is sufficient to also keep h[3]

unchanged. Without entropy-transfer from the random number, the malicious change of a[0] could go undetected.

Given the structure of the hashing function, the entropy-transfer must now destroy an attacker's ability to determine the bits to flip to counter-act the original alteration. The partial parity hash requires the entropy-transfer to scramble the bits in each cache word in a random fashion. The attacker then has to play a game of chance and bet that he guesses the new bit positions. A possible scrambling function can be realized with a hierarchical multiplexer structure shown in FIG. 5, where r[i] indicates bit position I of the random number.

It is important to understand that the choices of entropy-transfer and hashing functions are not independent of each other. For instance, using the partial hashing function an entropy-transfer function that XORing the cache word with the random number would be completely useless as it would simply translate into a constant '0' or '1' term for the bit sum given in equation (4).

Further, the choice of the hashing function also determines whether the bits of the random number should be used all for each cache word or be distributed evenly over all cache words. With the partial parity hash from above, all bits should be used for each word, because an attacker could hide his attack by carefully flipping bits within a single word to construct a hash collision.

The choice of the hashing and the entropy-transfer function has an important influence of the hardware required to implement the functionality. As it has been mentioned earlier, if the hashing function is constructed in a manner that every cache word (after entropy-transfer) has the same way of contributing to the hash, the hardware effort is minimized because only a fixed structure is needed, instead of lots of multiplexing to treat the cache words differently.

Figure 5:
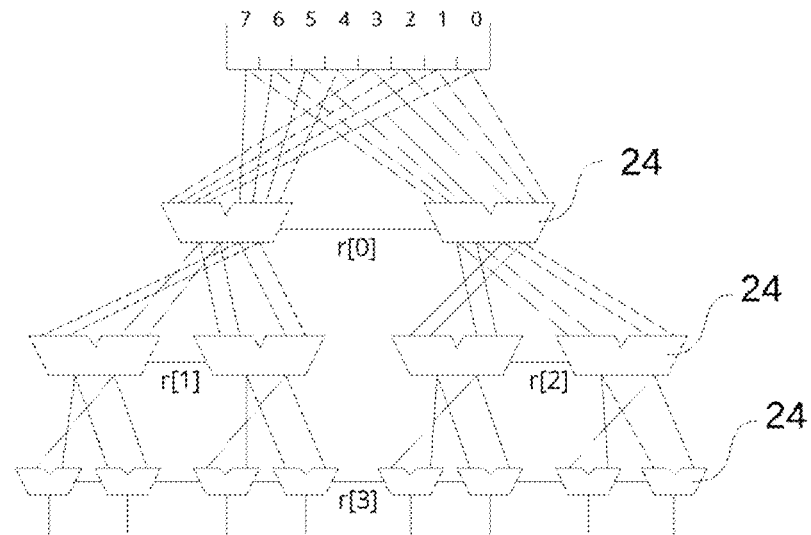
FIG. 5 Scrambling structure for entropy-transfer.
Figure 6:
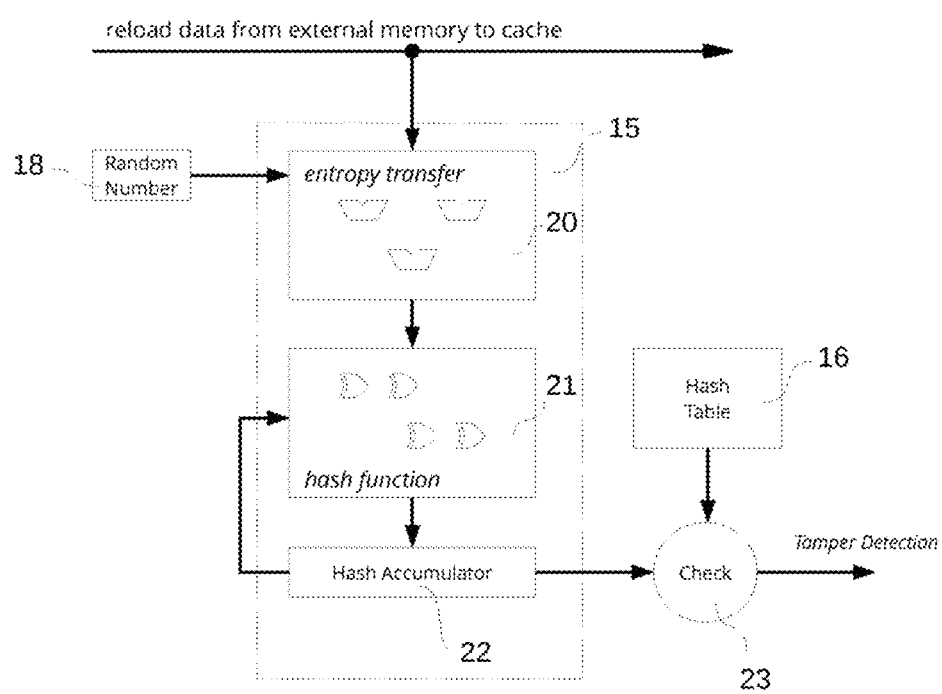
FIG. 6 Basic hardware implementation.

The hardware implementation as depicted in FIG. 6 has the following main parts: The cache protecting block snoops the data being reloaded into the cache and forwards them to the entropy-transfer block. The entropy-transfer block takes the stored random number from an internal location and uses it to control the bit scrambling. Internally, this block works as depicted in FIG. 5. From the entropy-transfer block the scrambled data is forwarded to the hashing function block. This executes the partial parity calculation according to eq. 4, but only for the terms from the current scrambled cache word. It merges these with the contents of the hash accumulator register. The hash accumulator stores intermediate parity results calculated by the hash block, also forwarding the intermediate result back to the hashing function block. The hash table stores the reference hashes to check against. The check block compares the final hash accumulator value, after the complete cache line has been processed, with the stored reference hash in the hash table. It then indicates whether the cache line has been altered. This indicator can then be used in the embedded processor to trigger appropriate action.

What is claimed is:

1. A method to protect code processed by an embedded micro-processor against altering comprising following steps:
   reading immutable boot code from an internal read only memory (ROM);
   loading a code image from an external memory and calculating a hash by a core unit;
   initially authenticating the hash using the boot code for decrypting the hash of the external memory; whereas
   concurrently calculating a salted hash for each equivalent of a cache line of the code image by a cache protection block;
   storing the salted hash for each cache line in an internal hash table; whereas
   if the authentication succeeds, a part of the code image is loaded into a secure cache of the embedded micro-processor.

2. The method according to claim 1, wherein if a secure cache miss occurs, the code image is reloaded from the external memory and the salted hash for the missed cache line is re-calculated by the cache protecting block and is checked against the stored salted hash in the internal hash table.

3. The method according to claim 2, further comprising determining a random number by a true random number generator and storing the random number in an internal location of the embedded micro-processor.

4. The method according to claim 3, wherein if the code image is reloaded from the external memory, the cache protecting block will snoop again a transfer from the external memory and use a stored random number, and re-calculate the hash for the cache line.

5. The method according to claim 4, further comprising checking the salted hash for the missed cache line against a stored value in the hash table, and a mismatch of the checking result indicates alteration of content in the external memory.

6. The method according to claim 2, further comprising taking an authenticated cache lines of the code image from the secure cache at future code execution.

7. The method according to claim 2, wherein calculating and decrypting the hash is performed by a cryptography unit.

8. The method according to claim 2, wherein if an authentication fails, the execution stops completely or a fall-back code from the ROM is used or the failure is reported to some higher-level agent.

9. The method according to claim 2, further comprising calculating the salted hash H for a cache line with a cache line length l by taking an entropy-transfer function $e(c_i,s)$ and a hashing function h, wherein $c_i$ is a word from a currently processed cache line CL, s is the random number used as salt and $e_i$ is a result of the entropy-transfer function $e(c_i,s)$.

10. The method according to claim 9, wherein the entropy-transfer function $e(c_i,s)$ is an algebraic sum modulo hash widths of $c_i$ and s, and/or a XORing of $c_i$ and s, and/or a scrambling of $c_i$ controlled by s, and/or a generation of a cyclic redundancy check(CRC) checksum on $c_i$ with s as seed.

11. The method according to claim 9, wherein the hashing function h is an algebraic sum $H=\Sigma_{i=0}^{l} e_i$ or a full parity over all $e_i$ or a partial parity function.

12. The method according to claim 9, wherein the salted hash H is calculated by $H=\Sigma_i e(c_i, s)=h(\{e_i | \forall i \in CL\})$.

13. The method according to claim 12, wherein the hashing function h fulfills the constraint that $h(e_i)|_{i=0}^{l-1}=h(e_j)|_{j=(l+k) \bmod l}^{(k+l-1) \bmod l}$ $\forall i,j,k$ $0 \leq i,j,k \leq lt$, whereas l is a cache line length.

14. The method according to claim 9, wherein the entropy-transfer function $e(c_i,s)$ is bijective.

15. The method according to claim 9, wherein the entropy-transfer function $e(c_i,s)$ works with the random number of arbitrary bit width.

16. The method according to claim 9, wherein the random number at least has as many bits as a hash result.

17. The method according to claim 9, wherein the calculated hashes are unique for every system on chip (SoC), also for the SoC with the same program code.

18. Apparatus for protecting code against altering, comprising a cache protecting block comprising an entropy transfer block for controlling a bit scrambling of a loaded code image from an external memory cache line wise and connected to a hashing function block that is connected to a hash accumulator register, whereas the hash function block and the hash accumulator register both calculating a salted hash for a current scrambled cache line, the apparatus further comprising a hash table storing reference hashes of the code image of the external memory and a check block comparing the salted hash with a stored reference hash in the hash table;
  wherein the apparatus reads immutable boot code from an internal read only memory (ROM), loads a code image from the external memory and calculates a hash using a core unit, initially authenticates the hash using the boot code for decrypting the hash of the external memory, concurrently calculates a salted hash for each equivalent of a cache line of the code image using the cache protection block, and stores the salted hash for each cache line in an internal hash table; whereas if the authentication succeeds, a part of the code image is loaded into a secure cache of the apparatus.

19. The apparatus for protecting code against altering according to claim 18, wherein the entropy transfer block is connected to an internal location of an embedded microprocessor.

20. The apparatus for protecting code against altering according to claim 18, wherein a true random number generator is connected to the cache protection block for providing random numbers and for hashes that are not replicable.

* * * * *